United States Patent Office 3,732,269
Patented May 8, 1973

3,732,269
METHOD OF MAKING HEXA-ALKYL DISTAN-
NOXANES TOGETHER WITH TETRA-ALKYL
TIN COMPOUNDS
Karl Rudolf Wehn and Eckhard Guderian, Kamen, Germany, assignors to Schering AG, Berlin and Bergkamen, Germany
No Drawing. Filed Nov. 2, 1971, Ser. No. 195,047
Claims priority, application Germany, Nov. 7, 1970,
P 20 54 902.4
Int. Cl. C07f 7/22
U.S. Cl. 260—429.7                    10 Claims

ABSTRACT OF THE DISCLOSURE

A method for making a mixture of a hexa-alkyl distannoxane and a tetra-alkyl tin compound, from which mixture the products—which are useful as biocides—can be separately recovered, by reacting tin tetrachloride with an aluminum trialkyl in a mol ratio of 0.98:1 to 0.78:1 in ether, and then hydrolyzing the reaction product under alkaline conditions.

The present invention relates to methods for making hexa-alkyl distannoxanes in combination with tetra-alkyl tin compounds and to methods for separating and isolating these compounds.

There has long existed a need in the art for pure trialkyl tin chlorides which, inter alia, can be converted to pure hexa-alkyl distannoxanes by hydrolysis. Such trialkyl tin monochlorides can be obtained either by the reaction of tin tetrachloride with aluminum alkyl compounds (cf. German patent publication DAS 1,157,617) or by a metathetical reaction of tetraalkyl tin with the tetrachloride according to Kozesko. A number of processes for the isolation of pure trialkyl tin chloride have also been described, for example in German Pat. 1,152,693, German patent publication DAS 1,167,836, and in German Pat. 1,271,113. In these processes, the crude product is purified either with water, with ammonia in aqueous acetone, or with ammonia or amines or amino alcohols.

An object of the present invention is the preparation of pure trialkyl tin chlorides or the corresponding hexaalkyl distannoxanes without the necessity for intermediate purification steps.

The object has been achieved by the process herein described for the preparation of hexa-alkyl distannoxanes, in combination with tetra-alkyl tin compounds, in which (1) tin tetrachloride is reacted with an aluminum trialkyl in a mol ratio of 0.98:1 to 0.78:1 in the presence of ether; (2) the reaction product is hydrolyzed under alkaline conditions; and (3) the resulting product is isolated.

According to the present invention, the mol ratio of the final products, namely of hexa-alkyl distannoxanes to tetra-alkyl tin compounds, may be varied between 90:10 and 10:90 depending on the mol ratio of the starting compounds. The ratio of the products can, therefore, advantageously be accommodated to the demand for a specific product.

A further advantage of the process of the present invention is that steps for the separation of trialkyl tin chlorides from dialkyl tin chlorides is not necessary, since the latter compounds are not formed according to the present invention. (When trialkyl tin chlorides which contain dialkyl tin chlorides are hydrolyzed, an undesirable sludge of dialkyl tin oxide, which is difficult to filter, otherwise is formed.) Separation of the hexa-alkyl distannoxanes from the second reaction product, namely the tin tetra-alkyls, proceeds very smoothly because of the considerable difference in boiling point between these materials.

A further important advantage of the present invention is that tin tetraalkyls which require no further purification are produced. The tin tetraalkyls produced according to the processes heretofore used commercially by a reaction of tin tetrachloride and aluminum alkyls contain differing amounts of trialkyl tin chloride which must be removed by corresponding purification methods, for example by alkaline hydrolysis. For both qualitative and technical reasons, the residue formed by this hydrolysis and remaining after distillative removal of the tin tetraalkyls cannot, however, usually be further processed, and must be destroyed.

Finally, according to the process of the present invention a considerable number of simplifications in the reaction apparatus are also possible since a series of tedious method steps, such as filtration and purification, can be avoided.

The process of the present invention can be employed in principle for the preparation of hexa-alkyl distannoxanes and tetra-alkyl tin compounds in which the alkyl radical contains three or four carbon atoms, e.g. n-propyl-, isopropyl-, n-butyl-, isobutyl, and sec-butyl radicals, for example. The corresponding aluminum trialkyls are involved in the preparation, e.g. tri-n-propyl aluminum, tri-isopropyl aluminum, tri-n-butyl aluminum, tri-isobutyl aluminum, and tri-sec-butyl aluminum. Optionally, the corresponding aluminum alkyl chloride can be used.

The reactants are suitably reacted at a temperature from 65° C. to 75° C. under anhydrous conditions, e.g. in an atmosphere of a dry inert gas such as nitrogen, in the presence of a dialkyl ether. Di-n-butyl ether is a preferred material. However, the alkyl groups of the ether do not participate in the reaction, and need not correspond with the alkyl groups present in the reactants. Depending on temperature and the specific reactants, the reaction is usually completed in 40–45 minutes.

The reaction product is then hydrolyzed by contact, conveniently at room temperature, with an alkali, suitably an alkali metal hydroxide such as aqueous sodium or potassium hydroxide, or with aqueous ammonia. Hydrolysis is complete in from about 20 minutes to one hour.

The products of the invention are suitably isolated by a discontinuous distillation, preferably under vacuum.

Both the hexa-alkyl distannoxanes and the tetraalkyl tin compounds so obtained have biocidal properties and are useful as bactericides and fungicides, for example. Also, the tetra-alkyl tin compounds are valuable intermediates for the preparation of other biocidal agents and for preparing stabilizers for polyvinyl chloride.

A better understanding of the present invention and of its many advantages will be had by referring to the following specific examples given by way of illustration. The examples all refer to large-scale commercial syntheses taking place in a continuous reactor system comprising three sequentially connected reaction vessels having volumes, respectively, of 190, 440, and 740 liters. Prior to introduction into the reactor, the reactants and ether reaction medium are kept under dry nitrogen. Similarly, the reactor is flushed with dry nitrogen. During hydrolysis and distillation, no such protective measures need be taken.

EXAMPLE 1

4323 kg. of tributyl aluminum are combined at 70° C. over a period of 33 hours with 5517 kg. of tin tetrachloride and 4160 kg. of di-n-butyl ether in the apparatus described above under normal pressure. The resulting mixture of tributyl tin chloride and about 13 percent of tetrabutyl tin in di-n-butyl ether is stirred at room temperature (20° C.) in a stirring vessel with 6600 kg. of 13 percent aqueous sodium hydroxide. The mixture of tributyl tin oxide (hexabutyl distannoxane) and tetrabutyl tin, in di-n-butyl ether, formed by the hydrolysis is subjected to a discontinuous vacuum distillation using a 15 m.³-flask and a packed column, 0.7 m. in diameter, 3.4 m. in height, corresponding with fourteen theoretical plates. By vacuum distillation, 4035 k. of di-n-butyl ether, 778 kg. of 97 percent tetrabutyl tin, 212 kg. of an intermediate cut, and 5160 kg. of 98.5 percent of tributyl tin oxide are obtained. A sump residue of 218 kg. remains. By further distillation of intermediate cuts, a further 78 kg. of tetrabutyl tin and 106 kg. of tributyl tin oxide is obtained from this batch. The total yield in tetrabutyl tin and tributyl tin oxide, calculated on the tributyl aluminum compound employed, amounts to 96.1 percent.

Details of the distillation are given below:

|  | Head temp. (° C.) | Pot temp. (° C.) | Pressure (mm. Hg.) |
| --- | --- | --- | --- |
| Di-n-butyl ether | (¹) | (²) | 80-30 |
| Tetra-n-butyl tin | 125-132 | 140-174 | 2.3-3.5 |
| Intermediate cut | 133-185 | 175-215 | 2.0-2.5 |
| Hexa-n-butyl distannoxane | 189-189 | 216-235 | 1.5-2.0 |

¹ To 125° C.  ² To 140° C.

EXAMPLE 2

5223 kg. of tributyl aluminum are reacted with 5480 kg. of tin tetrachloride and 5140 kg. of di-n-butyl ether as described in Example 1. The resulting mixture of tetrabutyl tin and about 25 percent of tributyl tin chloride in di-n-butyl ether is stirred in a stirring container at room temperature with 2000 kg. of 12 percent aqueous sodium hydroxide. The mixture of tetrabutyl tin and the resulting tributyl tin oxide in di-n-butyl ether is subjected to discontinuous vacuum distillation, using an apparatus as described in Example 1. On vacuum distillation, 4998 kg. of di-n-butyl ether, 4987 kg. of 97 percent tetrabutyl tin, 161 kg. of an intermediate cut, and 1621 kg. of 97.5 percent tributyl tin oxide are formed. A sump residue of 231 kg. remains. On further distillation of intermediate cuts, a further 56 kg. of tetrabutyl tin and 84 kg. of tributyl tin oxide are obtained from the batch. The total yield of such a butyl tin and tributyl tin oxide, calculated on the tributyl aluminum compound employed amounts to 95.3 percent.

EXAMPLE 3

4846 kg. of tributyl aluminum is reacted with 5190 kg. of tin tetrachloride and 4770 kg. of di-n-butyl ether as in Example. 1. The resulting mixture of tetrabutyl tin and about 40 percent of tributyl tin chloride in di-n-butyl ether is stirred in a stirring container at room temperature with 3910 kg. of 9 percent aqueous sodium hydroxide. The resulting mixture of tetrabutyl tin and about 40 percent tributyl tin chloride in di-n-butyl ether is subjected to discontinuous distillation using the apparatus of Examples 1 and 2. 4627 kg. of di-n-butyl ether, 3728 kg. of 97 percent tetrabutyl tin, 157 kg. of intermediate cuts, and 2410 kg. of 97 percent tributyl tin oxide are obtained. A sump residue of 205 kg. remains. By a further distillation of the intermediate cuts, a further 62 kg. of tetrabutyl tin and 78 kg. of tributyl tin oxide are obtained for this batch. The total yield of tetrabutyl tin and tributyl tin oxide, calculated on the tributyl aluminum compound employed is 93.7 percent.

What is claimed is:

1. A method for making a hexa-alkyl distannoxane in combination with a tetra-alkyl tin compound which comprises reacting tin tetrachloride with an aluminum trialkyl in a mol ratio of 0.98:1 to 0.78:1 in the presence of ether, and then hydrolyzing the reaction product with aqueous alkali.

2. A method as in claim 1 wherein said hexa-alkyl distannoxane and said tetra-alkyl tin compound are separately recovered from the hydrolyzed reaction product.

3. A method as in claim 2 wherein said hydrolyzed reaction product is distilled to recover and separate said hexa-alkyl distannoxane and said tetra-alkyl tin compound.

4. A method as in claim 1 wherein the alkyl group of said alkyl tin compounds has 3 or 4 carbon atoms.

5. A method as in claim 4 wherein said alkyl group is a primary or secondary alkyl group.

6. A method as in claim 1 wherein said ether is a dialkyl ether.

7. A method as in claim 6 wherein said dialkyl ether is di-n-butyl ether.

8. A method as in claim 1 wherein said reaction product is hydrolyzed with an aqueous solution of an alkali metal hydroxide or of ammonia.

9. A method for making a hexa-alkyl distannoxane in combination with a tetra-alkyl tin compound which comprises reacting tin tetrachloride with an aluminum trialkyl at a temperature between about 65° C. and about 75° C. in a mol ratio of 0.98:1 to 0.78:1 in the presence of a dialkyl ether, the alkyl groups of said alkyl tin compounds being primary or secondary propyl or butyl, and then hydrolyzing the reaction product with an aqueous solution of an alkali metal or of ammonia.

10. A method as in claim 9 wherein the hydrolyzed reaction product is distilled to recover and separate said hexa-alkyl distannoxane and said tetra-alkyl tin compound.

References Cited
UNITED STATES PATENTS

| 3,287,386 | 11/1966 | Neumann | 260—429.7 |
| 3,100,215 | 8/1963 | Gelbert | 260—429.7 |

WERTEN F. F. BELLAMY, Primary Examiner